United States Patent
Zehler

(10) Patent No.: US 7,925,427 B2
(45) Date of Patent: Apr. 12, 2011

(54) METROPOLITAN NAVIGATION SYSTEM

(75) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 964 days.

(21) Appl. No.: 11/766,342

(22) Filed: Jun. 21, 2007

(65) Prior Publication Data

US 2008/0319644 A1    Dec. 25, 2008

(51) Int. Cl.
    *G01C 21/26* (2006.01)
(52) U.S. Cl. ....................................... 701/201
(58) Field of Classification Search .......... 701/200–202, 701/208, 117–119; 340/988
    See application file for complete search history.

(56) References Cited

U.S. PATENT DOCUMENTS

| | | | |
|---|---|---|---|
| 6,701,248 B2 * | 3/2004 | Petzold et al. | 701/202 |
| 6,941,224 B2 * | 9/2005 | Fukuyasu | 701/213 |
| 7,421,341 B1 * | 9/2008 | Hopkins et al. | 701/208 |
| 2007/0040741 A1 | 2/2007 | Loomis | |
| 2007/0073524 A1 | 3/2007 | Song | |
| 2007/0100546 A1 | 5/2007 | Ring | |
| 2009/0119001 A1 * | 5/2009 | Moussaeiff et al. | 701/200 |

\* cited by examiner

*Primary Examiner* — Yonel Beaulieu
(74) *Attorney, Agent, or Firm* — Gibb I.P. Law Firm, LLC

(57) ABSTRACT

In embodiments herein, a desired destination is received from user input as an end location. The embodiments can determine the current position (the beginning location) based on automated positioning and/or user input. Thus, the embodiments can calculate potential routes from the beginning location to the end location and can select one of the potential routes (e.g., the best route). This selected route is output to the user. The potential routes that are selected from comprise mass transit rides.

19 Claims, 2 Drawing Sheets

METROPOLITAN NAVIGATION SYSTEM

BACKGROUND AND SUMMARY

Embodiments herein generally relate to systems, methods, services, etc. for providing navigation through urban environments and more particularly to a computerized device that can give ride-by-ride navigation instructions through different combinations of public transportation rides and pedestrian walkways.

The majority of conventional computerized navigation systems are designed for directing vehicles from a source to a destination based on a start address and an end address. Such conventional systems can also recalculate a route based on dynamic information such as a missed turn. Other systems are available for hikers which provide a general direction of travel needed to reach an input destination. For example, many different types of global positioning system (GPS) based navigation systems are currently available from manufactures such as Garmin, Ltd., George Town, Grand Cayman, Grand Cayman Islands, and Magellan Navigation, Inc., Santa Clara, Calif., USA and details of such systems are not discussed in detail herein to allow the reader to focus on the salient features of embodiments herein.

However, such conventional systems are of little use to a pedestrian in a large city who is not driving a car or navigating a forest, but instead is traveling along sidewalks and riding on public transportation systems, such as busses, subways, and taxi cabs. Prior to embodiments herein in order to navigate the mass transit system(s) users had to be able to read maps of the transit routes and correlate them with street addresses. One problem encountered when navigating within urban environments is that large cities often have multiple mass transit systems (e.g. subway, busses, and ferries) and do not have a comprehensive or coordinates means to combine these routes to facilitate travel within the metropolitan area.

Therefore, the metropolitan navigation system disclosed herein incorporates a display/input device, a location sensor, urban environment maps, addresses of points of interest, and routes and schedules of a city's mass transit system. The embodiments herein have logic necessary to generate detailed directions to a user entered destination. The directions produced by embodiments here optimize the use of public transportation. Thus, the embodiments herein direct the user to the closest mass transit entry point and direct the user through the transit system to the location closest to the entered destination. Further, with certain embodiments herein, walking distances can be provided to allow the user to determine if alternative modes of transportation (e.g. taxi) are required. The disclosed metropolitan navigation system can be a hand held device, a cellular phone, a hosted web service, etc.

In one embodiment a desired destination is received from user input as the end location. The embodiments can determine the current position (the beginning location) based on automated positioning and/or user input. Thus, the embodiments can calculate potential routes from the beginning location to the end location and can select one of the potential routes (e.g., the best route). This selected route is output to the user.

The potential routes that are selected from comprise mass transit rides. Therefore, the embodiments herein are intended to primarily be used by urban foot travelers who walk through urban environments having public transportation systems (as contrasted with individuals traveling within personal automobiles or traveling by foot in rural or forested environments). Thus, for purposes herein, the "mass transit ride legs" comprise public and commercial bus ride legs, public and commercial train ride legs, public and commercial subway ride legs, public and commercial ferry ride legs, public and commercial taxi ride legs, motorized and unmotorized pedestrian walks and all similar forms of public transportation that one would find in common urban environments.

In addition, embodiments herein can output, to the user, ride-by-ride navigation while the user is traversing the selected route. This ride-by-ride navigation comprises route legs, wherein each route leg comprises a different ride leg of the mass transit ride legs. For purposes herein, a "different ride leg" comprises a subsequent ride leg which, when compared to a relatively prior ride leg, requires the user to physically move from one of the mass transit ride legs to a different one of the mass transit ride legs.

In other words, the "different ride leg" comprises a subsequent leg which, when compared to a relatively prior leg, comprises a subsequent public and commercial bus ride leg, subsequent public and commercial train ride leg, subsequent public and commercial subway ride leg, subsequent public and commercial ferry ride leg, subsequent public and commercial taxi ride leg, and/or subsequent motorized and unmotorized pedestrian walk that is different than a relatively prior public and commercial bus ride leg, prior public and commercial train ride leg, prior public and commercial subway ride leg, prior public and commercial ferry ride leg, prior public and commercial taxi ride leg, and/or prior motorized and unmotorized pedestrian walk. Thus, each different ride leg requires the user to change buses, trains, ferries, etc.; change from a bus route to a train route, walk between different types of mass transit rides, etc.

During the ride-by-ride navigation, the method dynamically recalculates the selected route based on the current position. Further, embodiments here can re-determine the current position based on intermittent automated positioning calculation and/or user input. In one embodiment, the ride-by-ride navigation can determining whether one route leg has been completed based on comparing an elapsed time with an average historical time for that route leg, which is useful if antenna based information is not available or user input is not forthcoming.

An apparatus version of embodiments herein includes a device that has a processor operatively (directly or indirectly) connected to a power supply, a memory, a graphic user interface, and an antenna. As would be understood by those ordinarily skilled in the art, the present embodiments are not limited to this specific structure. Instead, the structures discussed herein are merely examples used to illustrate features of the invention and all similar structures are encompassed by this disclosure.

The memory is adapted to store many items of information such as mass transit ride legs. As mentioned above, such mass transit ride legs comprise public and commercial bus ride legs, public and commercial train ride legs, public and commercial subway ride legs, public and commercial ferry ride legs, public and commercial taxi ride legs, motorized and unmotorized pedestrian walks, etc.

The graphic user interface is adapted to receive, as user input, a desired destination as the end location and the antenna is adapted to receive wireless positional information. This allows the processor to determine the current position as the beginning location (based on the wireless positional information received through the antenna or user input received through the graphic user interface). Further, the processor calculates potential routes made up of mass transit ride legs from the beginning location to the end location. The processor selects one of the potential routes as a selected route, automatically or based on user selection. The graphic user interface then outputs the selected route to the user.

Further, the processor is adapted to calculate ride-by-ride navigation while the user is traversing the selected route. Again, such ride-by-ride navigation comprises route legs, wherein each route leg comprises a different ride of the mass transit ride legs. The graphic user interface outputs the dynamic ride-by-ride navigation. During the ride-by-ride navigation, the processor is further adapted to dynamically recalculate the selected route based on the current position. The current position can be based on intermittent receipt of the wireless position information through the antenna or user input received through the graphic user interface.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
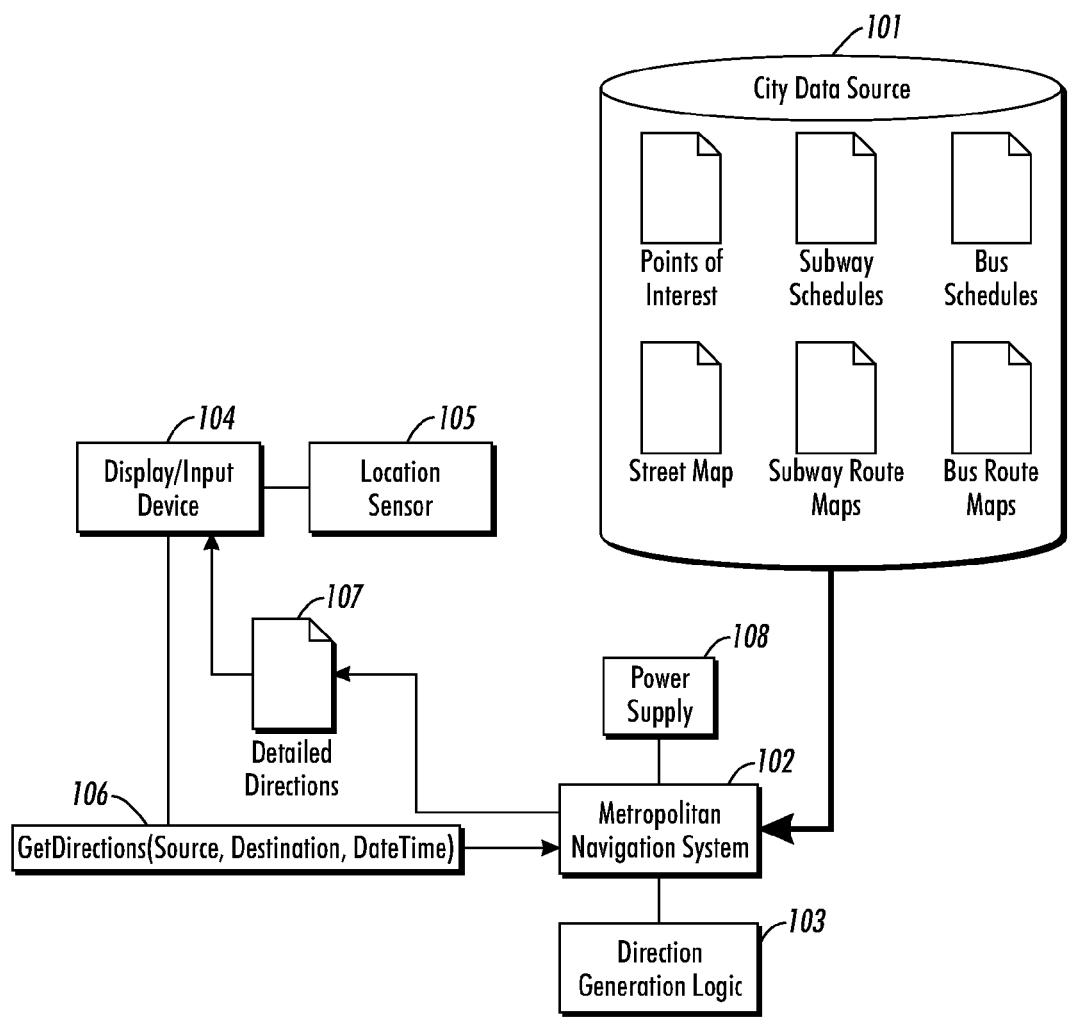
FIG. 1 is a schematic representation of a system according to embodiments herein.

Embodiments herein generally relate to systems, methods, services, computer programs etc. for providing navigation through public transportation systems and more particularly to a computerized device that can give ride-by-ride navigation instructions through different combinations of public transportation rides and pedestrian walkways.

In one embodiment a desired destination (the end location) is received or input by the user. The end location can be input in any manner, such as a street address, street intersection, latitude/longitude location, point of interest name, or any other useful input format. The embodiments herein can determine the current position (the beginning location) based on automated positioning and/or user input. For example, the beginning location can be determined by a global positioning system (GPS) or can be input by the user, using any of the input formats described above.

Once the embodiments herein obtain the ending and beginning locations, the embodiments can calculate potential routes from the beginning location to the end location and can select one of the potential routes (e.g., the best route). The "best" route can be selected based on predetermined criteria or criteria established by the user. Such criteria can include the best route being the shortest route, the quickest route, the least expensive route, the most scenic route, or other similar criteria. Further, the user can be allowed to select the "best" route from all possible routes, or a subset of some of the "best" routes as determined by the criteria discussed above. This selected route is output to the user either in printed form or as directions on a graphic user interface.

One feature of embodiments herein is that, because these embodiments are for navigating urban environments, the potential routes include mass transit rides as legs of the potential routes. Therefore, the embodiments herein can be used by urban foot travelers who walk through urban environments and ride along public transportation systems (as contrasted with individuals traveling within personal automobiles or traveling by foot in rural or hiking environments). Thus, for purposes herein, the "mass transit ride legs" of the potential and selected routes comprise public and commercial bus ride legs, public and commercial train ride legs, public and commercial subway ride legs, public and commercial ferry ride legs, public and commercial taxi ride legs, motorized and unmotorized pedestrian walks and all similar forms of public transportation that one would find in common urban environments (all of which can be independent of each other).

In addition, embodiments herein can output, to the user, ride-by-ride navigation while the user is traversing the selected route. This ride-by-ride navigation comprises disclosing a number of route legs to the user, one (or a few) at a time. Thus, as the user completes one ride leg, they are then presented with the next ride leg in ride-by-ride navigation. Each route leg comprises a different ride leg of the mass transit ride legs. For purposes herein, a "different ride leg" comprises a subsequent ride leg which, when compared to a prior ride leg, requires the user to physically move from one of the mass transit ride legs to a different one of the mass transit ride legs (e.g., move to a train or different train, move to a bus or different bus, etc.).

In other words, the "different ride leg" comprises a subsequent leg which, when compared to a relatively prior leg, comprises a subsequent public and commercial bus ride leg, subsequent public and commercial train ride leg, subsequent public and commercial subway ride leg, subsequent public and commercial ferry ride leg, subsequent public and commercial taxi ride leg, and/or subsequent motorized and unmotorized pedestrian walk that is different than a relatively prior public and commercial bus ride leg, prior public and commercial train ride leg, prior public and commercial subway ride leg, prior public and commercial ferry ride leg, prior public and commercial taxi ride leg, and/or prior motorized and unmotorized pedestrian walk. Thus, each different ride leg requires the user to change buses, trains, ferries, etc.; change from a bus route to a train route or vice versa, walk between different types of mass transit rides, etc.

During the ride-by-ride navigation, the method dynamically recalculates the selected route based on the then-current position. Therefore, if the user takes the wrong bus, wrong subway line, etc., the system can get the user back to the end location. Many times urban environments do not allow GPS calculations because large building often block the clear view of the sky required for GPS calculations. Similarly, GPS signals often do not reach into subway system tunnels.

Therefore, embodiments here can re-determine the current position based on intermittent automated positioning calculation (based on intermittently received GPS signals, when available) and/or user input. Thus, the user can manually enter when each ride leg has been completed, so the next leg can be displayed. Alternatively, the ride-by-ride navigation can determine whether one route leg has been completed based on comparing an elapsed time with an average historical time for that route leg. Such "elapsed time" based position calculations are usually quite reliable because the route traveled by the various public mass transit is fixed, and is usually completed is a very consistent average time. Further, the elapsed time based position calculations can be confirmed or corrected as the intermittent GPS signals (or user input) are received. These features are especially useful if antenna based information is not available or user input is not forthcoming.

As shown in FIG. 1, one apparatus embodiment comprises a data store or memory 101 that contains the street maps of the city and the routes of the mass transit systems. The schedules of the mass transit systems are available, and other items, such as a directory of points of interest can optionally be provided. This information is uploaded to the metropolitan navigation system central processor 102. The direction generation logic 103 is used by the processor 102 to develop and select routes. The user communicates with the device through the display/ input (graphic user interface which can include a printer, screen, keypad, pointing device, speaker, microphone, etc.) 104 to input a request for directions. A location sensor (antenna) 105 can be used to obtain the starting point or this can be input by the user. An embodiment may also make the points of interest from the data store 101 available to the user.

Once the user has decided on a destination, a request is made 106 that can include items such as the starting point, the destination, and the date and time. The metropolitan navigation system processor 102 and its incorporated direction generation logic 103 uses this information along with the information from the data store 101 to create detailed directions 107. The display/input unit 104 conveys the detailed directions 107 to the user and uses the location sensors 105 to track the user as the detailed directions 107 are followed.

Thus, one apparatus version of embodiments herein includes a device that has a processor 102 operatively (directly or indirectly) connected to a power supply 108, a memory 101, a graphic user interface 104, and an antenna 105. The technical details of design, manufacturing, etc. of such computerized GPS units is disclosed, for example, in U.S. Patent Publications 2007/0100546, 2007/0073524, and 2007/0040741 and such details are omitted herefrom to avoid obscuring the features of embodiments herein. As would be understood by those ordinarily skilled in the art, the present embodiments are not limited to the specific structure disclosed herein or disclosed in the referenced publications. Instead, the structures discussed herein are merely examples used to illustrate features of the invention and all similar structures are encompassed by this disclosure.

The memory 101 is adapted to store many items of information such as mass transit ride legs. As mentioned above, such mass transit ride legs comprise public and commercial bus ride legs, public and commercial train ride legs, public and commercial subway ride legs, public and commercial ferry ride legs, public and commercial taxi ride legs, motorized and unmotorized pedestrian walks, etc., all of which can be independent of each other. Further, the memory 101 stores the time schedules for stops along such ride legs, the average elapsed time for each of the legs (the average walking time for walking legs). Such information can be updated with new routes and time schedules, current delays, current detours, etc. by allowing the apparatus to periodically connect to a database through a network such as the internet.

The graphic user interface 104 is adapted to receive, as user input, a desired destination as the end location and the antenna 105 is adapted to receive wireless positional information (such as GPS signals). This allows the processor 102 to determine the current position as the beginning location (based on the wireless positional information received through the antenna 105 or user input received through the graphic user interface 104). Further, the processor 102 calculates potential routes made up of mass transit ride legs from the beginning location to the end location based on logic 103. The processor 102 selects one of the potential routes as a selected route, automatically or based on user selection. The graphic user interface 104 then outputs the selected route to the user through a display, printout, and/or verbal instructions.

Further, the processor 102 is adapted to calculate ride-by-ride navigation while the user is traversing the selected route. Again, such ride-by-ride navigation comprises route legs, wherein each route leg comprises a different ride of the mass transit ride legs. The graphic user interface 104 outputs the dynamic ride-by-ride navigation. During the ride-by-ride navigation, the processor 102 is further adapted to dynamically recalculate the selected route based on the current position. The current position can be based on intermittent receipt of the wireless position information through the antenna 105 or user input received through the graphic user interface 104.

Figure 2:
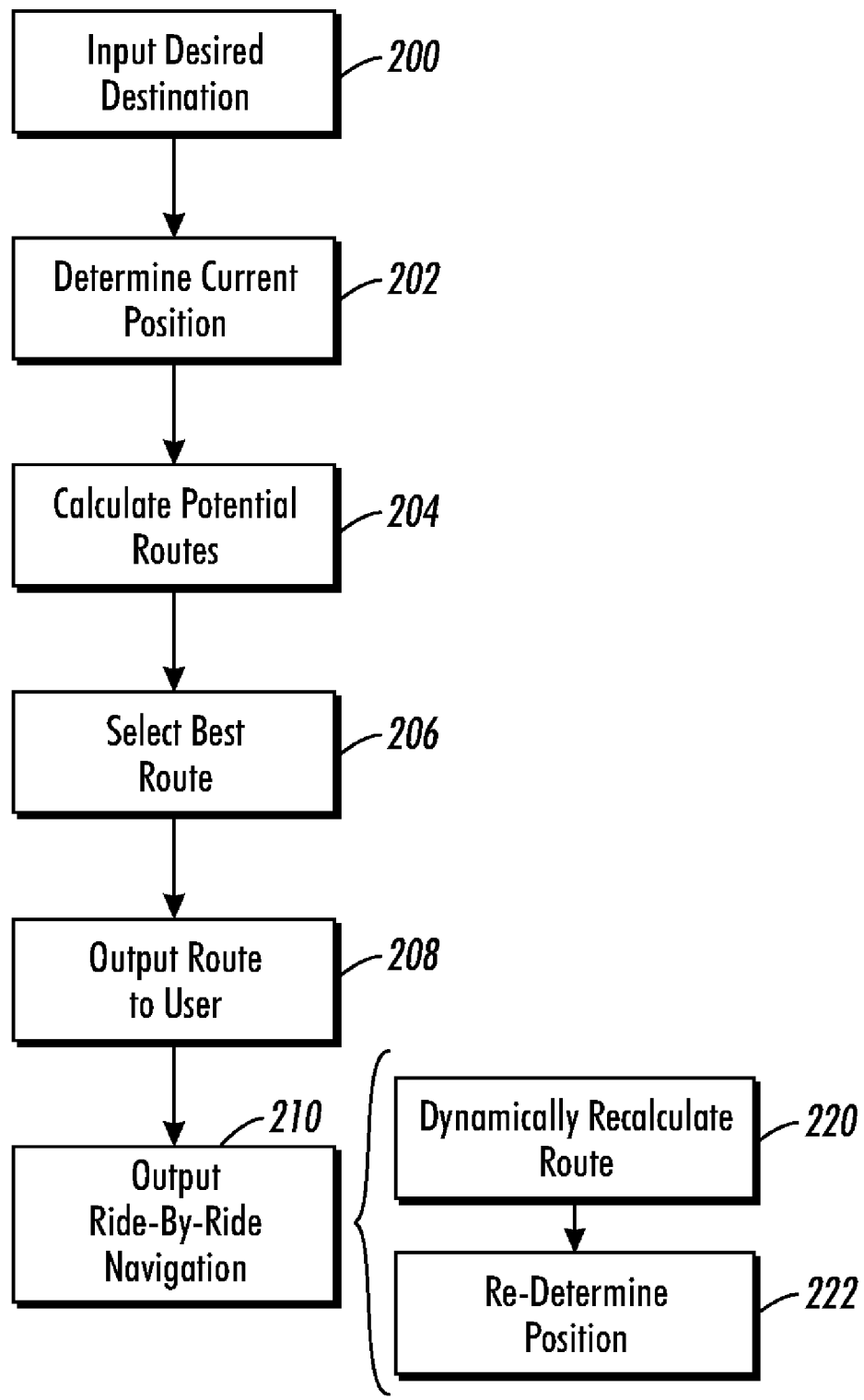
FIG. 2 is a flow diagram illustrating embodiments herein.

As shown in flowchart form in FIG. 2, in one embodiment a desired destination is received from user input as the end location 200. The embodiments can determine the current position (the beginning location) based on automated positioning and/or user input in item 202. With this information, the embodiments can calculate potential routes (item 204) from the beginning location to the end location and can selecting one of the potential routes (e.g., the best route) in item 206. This selected route is output to the user in item 208.

The potential routes that are selected from in item 206 comprise mass transit rides. Therefore, the embodiments herein are intended to primarily be used by urban foot travelers who walk through urban environments having public transportation systems (as contrasted with individuals traveling within personal automobiles or traveling by foot in rural or forested environments). Thus, as described above, for purposes herein, the "mass transit ride legs" comprise public and commercial bus ride legs, public and commercial train ride legs, public and commercial subway ride legs, public and commercial ferry ride legs, public and commercial taxi ride legs, motorized and unmotorized pedestrian walks and all similar forms of public transportation that one would find in common urban environments.

In addition, embodiments herein can output (display, printout, audible instructions, etc.), to the user, ride-by-ride navigation 210 while the user is traversing the selected route. This ride-by-ride navigation comprises route legs, wherein each route leg comprises a different ride leg of the mass transit ride legs. For purposes herein, a "different ride leg" comprises a subsequent ride leg which, when compared to a relatively prior ride leg, requires the user to physically move from one of the mass transit ride legs to a different one of the mass transit ride legs.

During the ride-by-ride navigation, the method dynamically recalculates the selected route (item 220) based on the current position. Further, embodiments here can re-determine the current position (item 222) based on intermittent automated positioning calculation and/or user input. In one embodiment, the ride-by-ride navigation can determining whether one route leg has been completed based on comparing an elapsed time with an average historical time for that route leg, which is useful if antenna 105 based information is not available or user input is not forthcoming. In other words, the processor 102 can begin counting the elapsed time at the beginning of a leg and automatically move to the next leg when the average elapsed time for that leg has been reached. This give the user the option to use the navigation device within areas that have no access to GPS or similar positional indicators, without having to constantly input their current position or having to manually move from each leg as a previous leg is completed.

Various computerized devices are mentioned above. Computers that include input/output devices, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein.

The embodiments herein are specifically applicable to portable navigation systems and can be incorporated into, for example, web enabled cellular telephones, personal digital assistants (PDAs), hand-held navigation devices, watches, MP3 players, portable computers, etc. The embodiments herein produce many advantages over existing navigation systems and mass transit hard copy maps because the embodiments herein integrate these two concepts in a single easy to use package. Thus, the embodiments herein inform the user not only where to go to catch the subway, bus, etc. but also specifies the exact subway line, bus route number, etc., the time of departure of the ride, as well as the specific stop to get off and walk or transfer to the next ride. Further, as described above, the embodiments herein can be used with limited or no GPS or other wireless positional support signals and are, therefore, very useful for urban or underground trips.

All foregoing embodiments are specifically applicable to computerized machines and/or processes as well as to software programs stored on the electronic memory 101 (computer usable data carrier) and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A method comprising:
   receiving, as user input, a desired destination as an end location;
   determining a current position as a beginning location;
   calculating potential routes from said beginning location to said end location;
   selecting one of said potential routes as a selected route; and
   outputting, to a user, said selected route,
   wherein said potential routes comprise mass transit ride legs,
   wherein said mass transit ride legs comprise motorized and unmotorized pedestrian walks and at least one of public and commercial bus ride legs, public and commercial train ride legs, public and commercial subway ride legs, public and commercial ferry ride legs, and public and commercial taxi ride legs,
   wherein said potential routes include specific departure times, entry points, and stops for specific ones of said mass transit ride legs, and
   wherein said calculating of said potential routes is based on an average elapsed time for each of said mass transit ride legs, an average walking time for motorized and unmotorized pedestrian walks, and route time schedules for stops on said mass transit ride legs.

2. The method according to claim 1, further comprising outputting, to said user, ride-by-ride navigation while said user is traversing said selected route, wherein said ride-by-ride navigation comprises route legs, wherein each route leg comprises a different ride leg of said mass transit ride legs.

3. The method according to claim 2, wherein said different ride leg comprises a subsequent ride leg which, when compared to a relatively prior ride leg, requires said user to physically move from one of said mass transit ride legs to a different one of said mass transit ride legs.

4. The method according to claim 2, wherein said different ride leg comprises a subsequent ride leg which, when compared to a relatively prior ride leg, comprises one of a subsequent public and commercial bus ride leg, subsequent public and commercial train ride leg, subsequent public and commercial subway ride leg, subsequent public and commercial ferry ride leg, subsequent public and commercial taxi ride leg, and subsequent motorized and unmotorized pedestrian walk that is different than a relatively prior public and commercial bus ride leg, prior public and commercial train ride leg, prior public and commercial subway ride leg, prior public and commercial ferry ride leg, prior public and commercial taxi ride leg, and prior motorized and unmotorized pedestrian walk.

5. The method according to claim 2, wherein during said ride-by-ride navigation, said method further comprises dynamically recalculating said selected route based on a current position, wherein said recalculating comprises re-determining said current position based on least one of intermittent automated positioning and user input.

6. A method comprising:
   receiving, as user input, a desired destination as an end location;
   determining a current position as a beginning location based on one of automated positioning and said user input;
   calculating potential routes from said beginning location to said end location;
   selecting one of said potential routes as a selected route;
   outputting, to a user, said selected route; and
   outputting, to said user, ride-by-ride navigation while said user is traversing said selected route,
   wherein said potential routes comprise mass transit ride legs,
   wherein said mass transit ride legs comprise motorized and unmotorized pedestrian walks and at least one of public and commercial bus ride legs, public and commercial train ride legs, public and commercial subway ride legs, public and commercial ferry ride legs, and public and commercial taxi ride legs,
   wherein said ride-by-ride navigation comprises route legs, wherein each route leg comprises a different ride leg of said mass transit ride legs,
   wherein said potential routes include specific departure times, entry points, and stops for specific ones of said mass transit ride legs, and
   wherein said calculating of said potential routes is based on an average elapsed time for each of said mass transit ride legs, an average walking time for motorized and unmotorized pedestrian walks, and route time schedules for stops on said mass transit ride legs.

7. The method according to claim 6, wherein said different ride leg comprises a subsequent ride leg which, when compared to a relatively prior ride leg, requires said user to physically move from one of said mass transit ride legs to a different one of said mass transit ride legs.

8. The method according to claim 6, wherein said different ride leg comprises a subsequent leg which, when compared to a relatively prior leg, comprises one of a subsequent public and commercial bus ride leg, subsequent public and commercial train ride leg, subsequent public and commercial subway ride leg, subsequent public and commercial ferry ride leg, subsequent public and commercial taxi ride leg, and subsequent motorized and unmotorized pedestrian walk that is different than a relatively prior public and commercial bus ride leg, prior public and commercial train ride leg, prior public and commercial subway ride leg, prior public and commercial ferry ride leg, prior public and commercial taxi ride leg, and prior motorized and unmotorized pedestrian walk.

9. The method according to claim 6, wherein during said ride-by-ride navigation, said method further comprises dynamically recalculating said selected route based on a current position, wherein said recalculating comprises re-determining said current position based on least one of intermittent automated positioning and user input.

10. The method according to claim 6, wherein said outputting of said ride-by-ride navigation comprises determining a completion of a first route leg based on comparing an elapsed time with an average historical time for said first route leg.

11. An apparatus comprising:
a power supply;
a processor operatively connected to said power supply;
a memory operatively connected to said processor, wherein said memory is adapted to store mass transit ride legs comprising motorized and unmotorized pedestrian walks and at least one of public and commercial bus ride legs, public and commercial train ride legs, public and commercial subway ride legs, public and commercial ferry ride legs, and public and commercial taxi ride legs;
a graphic user interface operatively connected to said processor, wherein said graphic user interface is adapted to receive, as user input, a desired destination as an end location; and
an antenna adapted to receive wireless positional information,
wherein said processor is adapted to:
determine a current position as a beginning location;
calculate potential routes comprising said mass transit ride legs from said beginning location to said end location; and
select one of said potential routes as a selected route,
wherein said graphic user interface is adapted to output said selected route,
wherein said potential routes include specific departure times, entry points, and stops for specific ones of said mass transit ride legs, and
wherein said calculating of said potential routes is based on an average elapsed time for each of said mass transit ride legs, an average walking time for motorized and unmotorized pedestrian walks, and route time schedules for stops on said mass transit ride legs.

12. The apparatus according to claim 11, wherein said processor is adapted to calculate ride-by-ride navigation while said user is traversing said selected route,
wherein said ride-by-ride navigation comprises route legs, wherein each route leg comprises a different ride of said mass transit ride legs, and
wherein said graphic user interface is adapted to output said ride-by-ride navigation.

13. The apparatus according to claim 12, wherein said different ride leg comprises a subsequent leg which, when compared to a relatively prior leg, requires said user to physically move from one of said mass transit ride legs to a different one of said mass transit ride legs.

14. The apparatus according to claim 12, wherein said different ride leg comprises a subsequent ride leg which, when compared to a relatively prior ride leg, comprises one of a subsequent public and commercial bus ride leg, subsequent public and commercial train ride leg, subsequent public and commercial subway ride leg, subsequent public and commercial ferry ride leg, subsequent public and commercial taxi ride leg, and subsequent motorized and unmotorized pedestrian walk that is different than a relatively prior public and commercial bus ride leg, prior public and commercial train ride leg, prior public and commercial subway ride leg, prior public and commercial ferry ride leg, prior public and commercial taxi ride leg, and prior motorized and unmotorized pedestrian walk.

15. The apparatus according to claim 12, wherein during said ride-by-ride navigation, said processor is further adapted to dynamically recalculate said selected route based on a current position, wherein said recalculating comprises re-determining said current position based on least one of intermittent receipt of said wireless position information through said antenna and user input received through said graphic user interface.

16. An apparatus comprising:
a power supply;
a processor operatively connected to said power supply;
a memory operatively connected to said processor, wherein said memory is adapted to store mass transit ride legs comprising motorized and unmotorized pedestrian walks and at least one of public and commercial bus ride legs, public and commercial train ride legs, public and commercial subway ride legs, public and commercial ferry ride legs, and public and commercial taxi ride legs;
a graphic user interface operatively connected to said processor, wherein said graphic user interface is adapted to receive, as user input, a desired destination as an end location; and
an antenna adapted to receive wireless positional information,
wherein said processor is adapted to:
determine a current position as a beginning location based on one of said wireless positional information received through said antenna and user input received through said graphic user interface;
calculate potential routes comprising said mass transit ride legs from said beginning location to said end location; and
select one of said potential routes as a selected route,
wherein said graphic user interface is adapted to output said selected route,
wherein said processor is adapted to calculate ride-by-ride navigation while said user is traversing said selected route,
wherein said ride-by-ride navigation comprises route legs, wherein each route leg comprises a different ride of said mass transit ride legs,
wherein said graphic user interface is adapted to output said ride-by-ride navigation,
wherein said potential routes include specific departure times, entry points, and stops for specific ones of said mass transit ride legs, and
wherein said calculating of said potential routes is based on an average elapsed time for each of said mass transit ride legs, an average walking time for motorized and unmotorized pedestrian walks, and route time schedules for stops on said mass transit ride legs.

17. The apparatus according to claim 16, wherein said different ride leg comprises a subsequent leg which, when compared to a relatively prior leg, requires said user to physically move from one of said mass transit ride legs to a different one of said mass transit ride legs.

18. The apparatus according to claim 16, wherein said different ride leg comprises a subsequent ride leg which, when compared to a relatively prior ride leg, comprises one of a subsequent public and commercial bus ride leg, subsequent public and commercial train ride leg, subsequent public and commercial subway ride leg, subsequent public and commercial ferry ride leg, subsequent public and commercial taxi ride leg, and subsequent motorized and unmotorized pedestrian walk that is different than a relatively prior public and commercial bus ride leg, prior public and commercial train ride leg, prior public and commercial subway ride leg, prior public and commercial ferry ride leg, prior public and commercial taxi ride leg, and prior motorized and unmotorized pedestrian walk.

19. The apparatus according to claim 16, wherein during said ride-by-ride navigation, said processor is further adapted to dynamically recalculate said selected route based on a current position, wherein said recalculating comprises re-determining said current position based on least one of intermittent receipt of said wireless position information through said antenna and user input through said graphic user interface.

* * * * *